United States Patent [19]

Van Manen

[11] 4,350,550

[45] Sep. 21, 1982

[54] METHOD OF DECORATING CONTRASTING REGIONS OF A MOLDED RESIN PANEL

[75] Inventor: Dick T. Van Manen, Canandaigua, N.Y.

[73] Assignee: Voplex Corporation, Pittsford, N.Y.

[21] Appl. No.: 259,991

[22] Filed: May 4, 1981

Related U.S. Application Data

[62] Division of Ser. No. 150,283, May 16, 1980, abandoned.

[51] Int. Cl.[3] .......... B05D 5/00; B32B 31/04; B44C 1/24

[52] U.S. Cl. .......... 156/237; 156/280; 427/250; 427/270

[58] Field of Search .......... 156/237, 280, 247; 427/270, 265, 258, 264, 269, 250, 259, 272, 282

[56] References Cited

U.S. PATENT DOCUMENTS

| | | | |
|---|---|---|---|
| 368,741 | 8/1887 | Wagenfohr | 428/187 |
| 1,019,408 | 3/1912 | Baekeland et al. | 428/529 |
| 1,618,491 | 2/1927 | Taliafero | 156/278 |
| 1,672,093 | 6/1928 | Sadtler | 156/212 |
| 2,139,640 | 12/1938 | Mall et al. | 427/250 X |
| 2,559,351 | 7/1951 | Drake et al. | 427/282 |
| 3,068,140 | 12/1962 | Biddle | 156/227 |
| 3,345,248 | 10/1967 | Pounds et al. | 428/503 |
| 3,716,440 | 2/1973 | Ando et al. | 156/277 |
| 3,799,792 | 3/1974 | Ryng | 427/255.5 |
| 3,809,568 | 5/1974 | Askew | 427/250 X |
| 3,960,639 | 6/1976 | Kudo | 156/222 |

FOREIGN PATENT DOCUMENTS

| | | | |
|---|---|---|---|
| 7310862 | 2/1974 | Netherlands | 427/272 |

OTHER PUBLICATIONS

Kut, S., *Decorating Plastics by Vacuum Metallisation,* in Canadian Paint and Finishing, 42(12): pp. 30–31, Dec. 1968.

*Primary Examiner*—Evan K. Lawrence
*Attorney, Agent, or Firm*—Stonebraker, Shepard & Stephens

[57] ABSTRACT

A method of decorating the front surface of a molded resin panel 10 to provide a decorative material 15 in one region 12 and a contrasting decorative coating 18 in another region 14. A resin undercoat 17 and a clear resin top coat 19 are provided for decorative coating 18. The method includes securing decorative material 15 to region 12 of panel 10, masking the decorative material throughout region 12, applying the decorative coating to the unmasked front surface regions of the panel, and unmasking the decorative surface material. A top coat 19 is formed to extend over both decorative coating 18 and decorative material 15 to protect and secure the decorative material with the same top coating that is required for the decorative coating.

2 Claims, 3 Drawing Figures

METHOD OF DECORATING CONTRASTING REGIONS OF A MOLDED RESIN PANEL

This is a divisional of application Ser. No. 150,283, filed May 16, 1980, abandoned.

BACKGROUND

For dashboards, doors, and elsewhere, the automotive industry demands resin panels having contrasting decorations in different regions. A typical panel for automotive purposes has a bright metal border and a contrasting region surfaced with a wood grain, printed pattern, simulated suede, or other decoration. Variations on this can include stripes, several contrasting decors, raised and lowered regions, recesses or ridges between regions, and other alternatives. My invention produces panels of this type, but is not limited to any particular decoration or end use.

Such panels have been made previously by molding resin to form the basic panel shape, undercoating the panel with a clear resin providing a smooth and receptive surface, vacuum metallizing this surface with a metallized layer, covering the metal layer with a clear resin top coat, and then adhering a contrasting applique over the top coat in another region of the panel. The adhesive is expensive; and the edges of the applique tend to work loose, marring the appearance.

My invention provides more efficient methods for decorating molded resin panels and also achieves a more attractive and durable result. It eliminates adhesive, protects the edges of decorated regions, and uses the top coat protecting the metallized layer to also protect the decorated surface.

SUMMARY OF THE INVENTION

My method decorates contrasting regions of a molded resin panel with a decorative material in one region and a decorative coating in another region, and the decorative coating has a resin undercoating and a clear resin top coating. I apply the decorative material to one region of the panel before applying the top coating over the decorative coating, and I form the top coating to extend over both the decorative coating and the decorative material to protect and secure the material with the same top coating that is required for the decorative coating.

DRAWINGS

DETAILED DESCRIPTION

Figure 1:
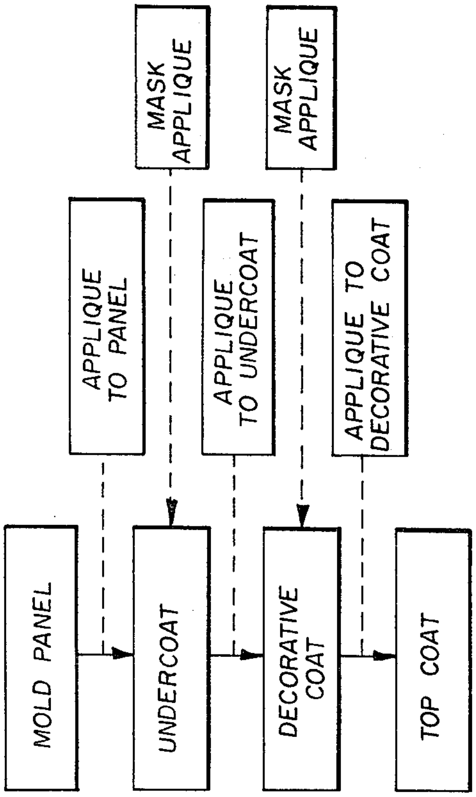
FIG. 1 is a schematic diagram of preferred steps in my inventive method.
Figure 2:
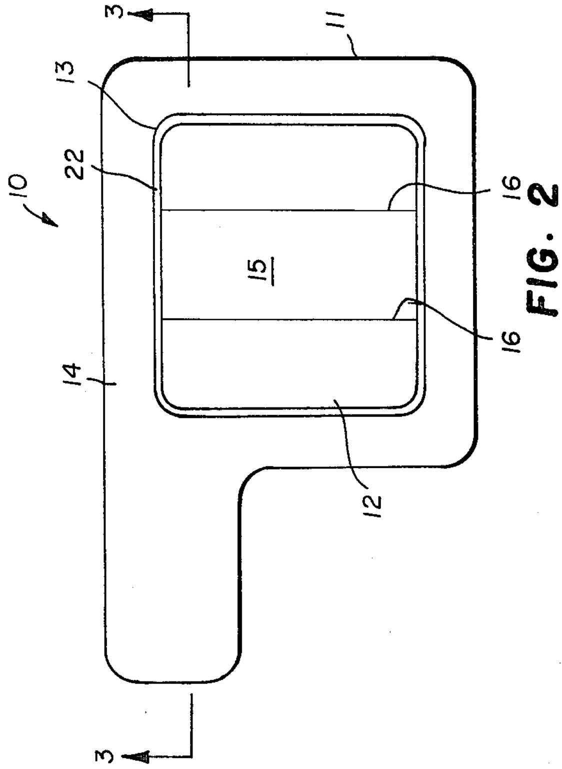
FIG. 2 is a plan view of an illustrative panel made according to my invention.

By several alternative preferred steps, I decorate a panel 10 with both a decorative material 15 in one region 12 of a base or support 11 and a contrasting coating 18 in another region 14. The contrasting regions 12 and 14 can be arranged at different levels, given different contours, and used for many different decorative effects. The resulting panel 10 can have several contrasting regions in many different shapes and decors. A recess 13 around region 12 between decorated surface 15 and contrasting region 14 is useful for a masking step described below and also conceals any mask line, but is not required.

I begin with an injection molded base or support 11 for panel 10, and this can be formed in different ways with different resin-forming techniques. Base 11 was a region 12 that is preferably generally flat to facilitate application of decorative material 15. This can be formed with many different patterns and materials and applied in different ways including hot stamping or other fusion bonding, printing, silk screening, painting, or other technique.

Decorative coat 18 is typically a metallized layer that can be vacuum deposited or spray coated in place, but it can also be formed of other materials to have different appearances. Decorative coat 18 requires a resin undercoat 17 affording a smooth and receptive surface and a protective top coat 19 formed of clear resin material through which decorative coat 18 is visible. Undercoat 17 is also preferably formed of clear resin material.

Top coat 19 is required to protect the appearance of decorative coat 18; but before top coat 19 is applied, surface 15 is applied so that top coat 19 can extend over surface 15 for protection, improved appearance, and durable wear life. This uses the required top coat 19 to improve the panel by protecting decorative material 15 as well as layer 18. Of course, the decorative material must be compatible with top coat 19; but this is easily achieved.

Figure 3:
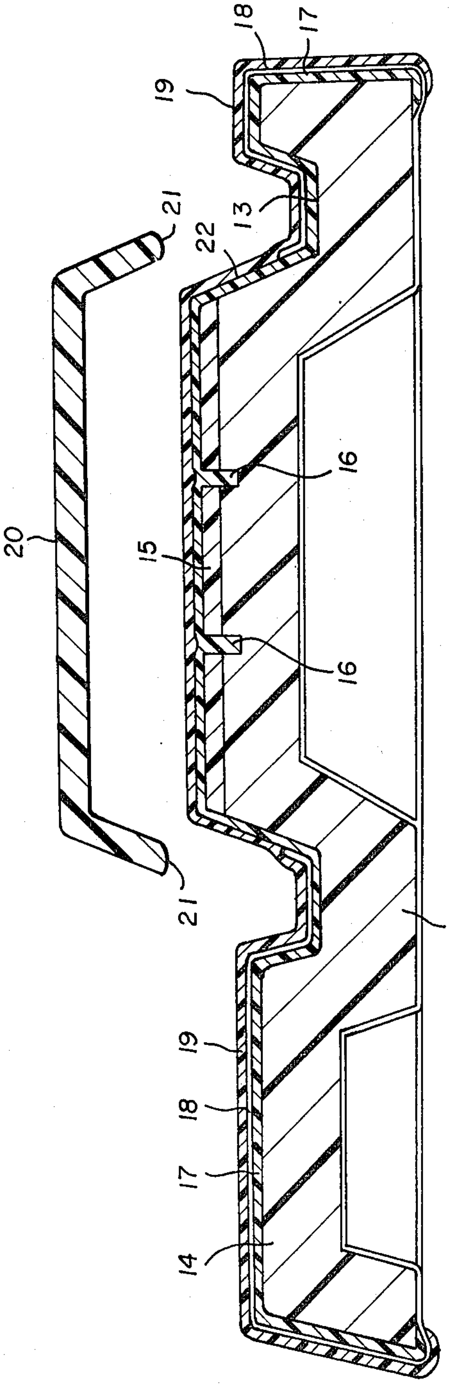
FIG. 3 is a partially exploded cross-sectional view of the panel of FIG. 2 taken along the line 3—3 thereof.

Decorative material 15 can be secured directly to panel 11 as shown in FIG. 3 with or without leaving spaces forming narrow contrasting stripes 16. Then clear resin undercoating 17 can be sprayed or flow coated over surface 15, and mask 20 can be used to prevent decorative coating 18 from encroaching on surface 15. Mask 20 is formed to fit over surface 15 and can have its edges 21 conveniently disposed in recess 13 to help conceal the mask line. Decorative coating 18 can then be sprayed or vacuum deposited over the front surface of panel 11 without spoiling the appearance of surface 15. Then mask 20 can be removed and clear top coat 19 can be spray or flow coated over both decorative coating 18 and surface 15 for additional protection.

A contrasting strip 22 can be left between material 15 and decorative coating 18 where undercoat 17 or support 11 is visible through top coat 19. Many other decorative alternatives are possible using top coat 19 to protect material 15.

I claim:

1. A method of decorating contrasting regions of the front surface of a molded resin panel with a decorative material in one region of said front surface and a decorative coating in another region of said front surface, said decorative coating having a resin undercoating and a clear resin top coating, and said method comprising:
   a. securing said decorative material to said one region to form a surface decoration differing from the appearance of said molded resin of said front surface of said panel;
   b. masking said decorative material throughout said one region of said front surface;
   c. applying said decorative coating to unmasked front surface regions of said panel outside said one region bearing said decorative material, so said decorative coating covers said other region of said front surface of said panel;
   d. unmasking said decorative material; and
   e. forming said top coating to extend over all of said front surface of said panel to cover both said decorative coating and said decorative material.

2. The method of claim 1 including applying said decorative material to said one region before undercoating and forming said undercoating of clear resin extending over said decorative material before said masking step.

* * * * *